(12) United States Patent
Nystad et al.

(10) Patent No.: US 8,990,518 B2
(45) Date of Patent: Mar. 24, 2015

(54) METHODS OF AND APPARATUS FOR STORING DATA IN MEMORY IN DATA PROCESSING SYSTEMS

(75) Inventors: Jorn Nystad, Trondheim (NO); Ola Hugosson, Lund (SE)

(73) Assignee: Arm Limited, Cambridge (GB)

( * ) Notice: Subject to any disclaimer, the term of this patent is extended or adjusted under 35 U.S.C. 154(b) by 147 days.

(21) Appl. No.: 13/198,449

(22) Filed: Aug. 4, 2011

(65) Prior Publication Data

US 2013/0036290 A1 Feb. 7, 2013

(51) Int. Cl.
*G06F 12/00* (2006.01)
*G06F 12/06* (2006.01)

(52) U.S. Cl.
CPC ....................................... *G06F 12/06* (2013.01)
USPC ........................................................ 711/154

(58) Field of Classification Search
None
See application file for complete search history.

(56) References Cited

U.S. PATENT DOCUMENTS

| | | | |
|---|---|---|---|
| 6,130,680 A | | 10/2000 | Cox et al. |
| 8,346,823 B2 * | | 1/2013 | Gaeta ............................ 707/822 |
| 2005/0174355 A1* | | 8/2005 | Sadowsky et al. ............ 345/557 |
| 2009/0244074 A1 | | 10/2009 | Montrym et al. |
| 2010/0328329 A1 | | 12/2010 | Mallett |
| 2013/0036290 A1 | | 2/2013 | Nystad et al. |

OTHER PUBLICATIONS

Office Action dated Sep. 23, 2014 in U.S. Appl. No. 13/566,887, 28 pages.
Response to Office Action filed Jan. 23, 2015 in U.S. Appl. No. 13/566,887, 11 pages.

* cited by examiner

*Primary Examiner* — Matthew Bradley
*Assistant Examiner* — Daniel Tsui
(74) *Attorney, Agent, or Firm* — Vierra Magen Marcus LLP (57) ABSTRACT

A data array 20 to be stored is first divided into a plurality of blocks 21. Each block 21 is further sub-divided into a set of sub-blocks 22, and a set of data for each sub-block 22 is then stored in one or more body blocks 25. A header data block 23 is stored for each block 21 at a predictable memory address within a header buffer 24. Each header data block contains pointer data indicating the position within a body block 25 where the data for the sub-blocks for the block 21 that that header data block 23 relates to is stored, and data indicating the size of the stored data for each respective sub-block 22.

20 Claims, 3 Drawing Sheets

METHODS OF AND APPARATUS FOR STORING DATA IN MEMORY IN DATA PROCESSING SYSTEMS

BACKGROUND

The technology described herein relates to a method of and apparatus for storing data in memory in data processing systems, and in particular to such a method and apparatus for use to store texture data and frame buffer data in computer graphics processing systems.

It is common in computer graphics systems to generate colours for sampling positions in the image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to store such texture data in a "compressed" form so as to try to reduce, e.g., the storage and bandwidth burden that may be imposed on a device.

A further consideration when storing texture data (whether compressed or not) for use in graphics processing is that typically the graphics processing system will need to be able to access the stored texture data in a random access fashion (as it will not be known in advance which part or parts of the texture map will be required at any particular time). This places a further constraint on the storage of the texture data, as it is accordingly desirable to be able to store the texture data in a manner that is suitable for (and efficient for) random access to the stored data. This problem can be exacerbated where the size of the stored texture data in memory can vary, e.g. because the compression rate applied to the texture data is variable.

One way to facilitate random access to texture data is to store the texture data in memory on a block-by-block basis, at fixed memory locations, with each block being allocated sufficient memory space to store the maximum size any block to be stored could require (after any compression). However, the Applicants have recognised that this could be relatively wasteful of memory space, e.g., if not all blocks were to require the maximum possible memory space.

The Applicants accordingly believe that there remains scope for, and a need for, more efficient arrangements for storing data, such as texture data for use in graphics processing, in memory.

BRIEF DESCRIPTION OF THE DRAWINGS

A number of embodiments of the technology described herein will now be described by way of example only and with reference to the accompanying drawings, in which.

DETAILED DESCRIPTION

A first embodiment of the technology described herein comprises a method of storing an array of data in memory, the method comprising:

dividing the array of data to be stored into a plurality of blocks;

dividing each respective block of the data array into a plurality of sub-blocks;

storing data representing each respective sub-block of the data array in memory; and storing, for each respective block that the data array has been divided into, a header data block at a predictable memory address, the header data block containing pointer data indicating the location in memory where the data for the sub-blocks for the block of the data array that the header data block relates to is stored.

A second embodiment of the technology described herein comprises an apparatus for storing an array of data in memory, the apparatus comprising:

processing circuitry configured to:

divide the array of data to be stored into a plurality of blocks;

divide each respective block of the data array into a plurality of sub-blocks;

store data representing each respective sub-block of the data array in memory; and store, for each respective block that the data array has been divided into, a header data block at a predictable memory address, the header data block containing pointer data indicating the location in memory where the data for the sub-blocks for the block of the data array that the header data block relates to is stored.

In some embodiments, the processing circuitry may be in communication with one or more memory devices that store the data described herein and/or store software for performing the processes described herein. The processing circuitry may also be in communication with a display for displaying images based on the data described above.

A third embodiment of the technology described herein comprises a stored set of data (and/or data format) representing an array of data to be used in a data processing system, comprising:

a plurality of header data blocks, each header data block being stored at a predictable memory address and relating to a respective block of a plurality of blocks that the data array has been divided into; and a plurality of sets of sub-block data, each set of sub-block data relating to a respective sub-block that a block of the data array has been divided into; and wherein:

each block that the data array has been divided into is divided into plural sub-blocks; and each header data block contains pointer data indicating the location in memory where the sets of sub-block data for the respective sub-blocks that the block of the data array that the header data block relates to has been divided into is stored.

In one example implementation, the stored set of data is stored on a computer readable storage medium in the data format described above.

In the technology described herein, an array of data (which may be, as discussed above, an array of (compressed) texture data) to be stored in memory is first divided into plural blocks, and then each block is sub-divided into plural sub-blocks. Data representing the sub-blocks is then stored in memory, but together with header data blocks which point to the respective sub-blocks data for the block which the header data relates to.

The header data blocks are stored at memory locations that are predictable. This allows the header blocks to be readily retrieved in use.

As the header data blocks are stored at predictable memory locations, that reduces the constraints on storing the rest of the data. For example, there is no need to store the data for the individual sub-blocks at fixed or predefined memory locations, nor in fixed-sized memory locations, as the header data block information can be used to retrieve the sub-blocks' data.

Also, by dividing the data array into blocks in this manner, the stored data can effectively be accessed randomly at the data block level (i.e. random access is available to the individual blocks that the data array is divided into).

The effect of this is that the technology described herein can provide a data storage arrangement that can link variable sized compressed data in memory whilst still allowing random access to parts of that data. It can also provide energy efficient access patterns and allow multiple encoders to encode a data stream (array) in parallel. When it is used for compressed texture data, the technology described herein can allow variable-sized compressed texture data to be fetched without needing to decompress the entire texture data array. When used for other data, such as the frame buffer in graphics, it can facilitate simple rotation and cropping, for example. This can all help to reduce bandwidth and power on a system level.

The data array that is to be stored in the technology described herein can be any suitable data array. It should comprise a plurality of data elements (entries), each occupying different positions in the array. The data array in an embodiment represents an image.

As discussed above, in an embodiment the data array is a graphics texture. The graphics texture may be, and in an embodiment is, compressed before being stored in the manner of the technology described herein.

However, the technology described herein is not exclusively applicable to graphics textures, and may equally be used for other forms of data array, e.g. image. For example, the Applicants believe the technology described herein may be equally useful for storing frame buffer data (for use as a frame buffer format), e.g. in graphics processing systems and for use with display controllers, as it can, for example, give predictable memory read patterns for a display controller and facilitate simple rotation and cropping when used as a frame buffer format. Thus, in an embodiment the data array is a frame of data to be stored in a frame buffer, e.g. for display.

In an embodiment, the technology described herein is used both when storing texture data and as the frame buffer format in a graphics processing system. Thus, the technology described herein also extends to a graphics processing system that uses the arrangement of the technology described herein both for storing texture data and as its frame buffer format.

The technology described herein may also be used, for example, in image signal processing (image signal processors) and video encoding and decoding (video encoders and decoders).

The blocks that the data array (e.g. texture) to be stored is divided into can take any suitable and desired form. Each block should comprise a sub-set of the data elements (positions) in the array, i.e. correspond to a particular region of the array. In an embodiment the array is divided into non-overlapping and regularly sized and shaped blocks. The blocks are in an embodiment square, but other arrangements could be used if desired. The blocks in an embodiment correspond to a block size that will otherwise be used in the data processing system in question. Thus, in the case of a tile-based graphics processing system, the blocks in an embodiment correspond to (have the same size and configuration as) the tiles that the rendering process of the graphics processing system operates on.

(As is known in the art, in tile-based rendering, the two dimensional output array of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In an embodiment, the data array is divided into 8×8, 16×4 or 16×16 blocks (i.e. blocks of 8×8, 16×4 or 16×16 array positions (entries)). Thus, in the case of a texture map, for example, each block will in an embodiment correspond to 16×16 (or 8×8 or 16×4) texels, and in the case of a frame for the frame buffer, each block will in an embodiment correspond to 16×16 (or 8×8 or 16×4) pixels or sampling positions of the frame. Other arrangements would, of course, be possible.

The individual blocks of the data array can similarly be divided into any suitable and desired set of sub-blocks. Again, the sub-blocks should comprise a sub-set of the data elements (positions) that the block relates to, are in an embodiment non-overlapping and regularly-sized and shaped, and are in an embodiment square (at least where the data blocks themselves are square). Other arrangements would, of course, be possible. In an embodiment, each data block is divided into 4×4 data position sub-blocks. Where 16×16 data blocks are used, each data block may accordingly be divided into sixteen 4×4 data position (data element) sub-blocks.

The data that is stored for each sub-block can take any suitable and desired form, and will depend, as will be appreciated by those skilled in the art, upon the nature of the data being stored, e.g. whether it is a texture, a frame for the frame buffer, whether and how it has been encoded, compressed, etc. The stored sub-block data should be some or all of the data that is required for and/or that relates to, the data array positions (entries) that the sub-block corresponds to (represents).

The data that is stored for a sub-block may indicate directly the data array values for the data array elements (positions) that the sub-block corresponds to, or it may be data from which these data array values can be derived (i.e. data to be used to, and to allow, the data array values for the data array elements (positions) to be determined). The latter will be the case where, for example, the stored data array is encoded and/or compressed before being stored. Thus, in an embodiment, the technology described herein comprises encoding, e.g. compressing, the original data entries in the data array for each sub-block, to generate an encoded, e.g. compressed, representation of the data values for those data entries, and then storing the encoded, e.g. compressed, representation of the data values as the data for the sub-block.

In the case of a texture, for example, the data that is stored for a sub-block should be data to allow appropriate texture data (texel values) for the sub-block to be determined. Such texture data could comprise, e.g., a set of colour values (Red, Green, Blue (RGB), a set of colour and transparency values (Red, Green, Blue, Alpha (RGBa)), a set of luminance and chrominance values, a set of shadow (light)-map values, a set of a normal-map (bump-map) values, z values (depth values), stencil values, luminance values (luminance textures), luminance-alpha-textures, and/or gloss-maps, etc.

In the case of a frame for display, to be stored in a frame buffer, the data that is stored for a sub-block should be data to allow appropriate pixel and/or sampling position data (values) for the sub-block to be determined. Such pixel data could comprise, e.g., appropriate colour (RGB) values, or luminance and chrominance values.

The data for the data array can be processed to generate the data for the sub-blocks and the header data blocks in any suitable and desired manner. For example, a suitable processor or processing circuitry may read the original data array to be stored from memory, and/or receive a stream of data corresponding to the original data array to be stored, and then process the stream of data accordingly, i.e. to divide it into blocks and sub-blocks, and generate the necessary header data blocks and, e.g. encoded, sub-blocks data, and then store the data in memory.

The data representing (for) the sub-blocks can be stored in memory in any desired and suitable manner and arrangement. As discussed above, there is no requirement to store this data (the sub-blocks) at predictable or pre-defined memory locations, as the header data blocks contain the necessary information to allow the sub-blocks to be located in memory.

In an embodiment, the set of sub-blocks for a given data block (the data representing the sub-blocks in the set of sub-blocks for a data block) are stored at contiguous locations, one after another, in memory. As will be discussed further below, this can reduce the amount of data that the header data blocks need to contain to allow the sub-blocks to be retrieved. The sets of sub-blocks are in an embodiment stored using the same sub-block order within each stored set of sub-blocks.

In an embodiment, the sets of sub-blocks for a given data array are stored together in the memory, one-after-another. The sets of sub-blocks may be stored in the order of the blocks of the data array to which they relate, but this is not necessary.

In an embodiment, the stored sub-blocks are arranged in fixed size, and in an embodiment aligned, blocks in memory. Each such "sub-block storage" block in an embodiment contains a fixed number of bytes of data, such as 1024 bytes of data. Arranging the data for the sub-blocks in blocks in memory in this manner facilitates encoding a data array using several different encoders in parallel, as each encoder can allocate a new memory block (e.g. through a central repository) every time it runs out of space (in its current sub-block storage "block").

In such arrangements, a given set of sub-blocks (i.e. the sub-blocks for given data block that the data array has been divided into) may be allowed to be stored in two separate sub-block storage blocks if required, i.e. for a given set of sub-blocks to be able to span two different sub-block storage blocks in memory. As will be discussed below, the header data block for such a set of sub-blocks can in an embodiment indicate this when this has happened. This avoids the need to leave any "empty" space in a given sub-block storage block where the block in memory cannot be filled completely by complete sets of sub-blocks.

The header data blocks can similarly be stored in memory in any desired and suitable manner and arrangement. In an embodiment all the header data blocks for a data array are stored together, in a given part of the memory, which can accordingly be thought of as a "header buffer" for the stored data array. Thus, in an embodiment, all the header data blocks for a given data array are stored in a header buffer for the data array.

The header data blocks should be stored at predictable memory addresses (locations). In an embodiment, they are stored at memory addresses (locations) that can be predicted from (that are determined from) the position of a data element and/or of the data block in the array that the header data block relates to. Thus, the storage location (memory address) of each header data block (e.g. within a header buffer having a known location in memory) is in an embodiment dependent upon the position within the data array of the block of the data array that the header data block relates to.

In an embodiment, the storage location (memory address) for a header data block, relative to the start location (address) of the header buffer for a data array, is determined by means of a predetermined function of the relative position of the data block (or data element) within the data array that the header data block relates to. In an embodiment, for a data array having vertical and horizontal dimensions xsize and ysize, respectively, and divided into a×a-sized data blocks, and having a header data block size h (in bytes), then if A is the start address of the header buffer in memory, the memory address (location) of the header data block for a given data element of the array (e.g. texel/pixel) at position x, y is given by:

header data block address=$A+h*(x/a+(y*xsize)/a)$

Thus, for a block size of 16×16 array entries, with 64-byte header data blocks, the address of the header data block for a given data element of the array (e.g. texel/pixel) at position x, y will be given by:

header data block address=$A+64*(x/16+(y*xsize/16)$.

There will be one header data block for each block that the data array is divided into. As discussed above, each header data block will contain pointer data indicating the location in memory of the data for the sub-blocks for the block of the data array that the header data block relates to. Such pointer data can take any desired and suitable form. It could, for example, indicate directly the memory location (address) of the sub-block data, or indicate it indirectly, e.g., as an offset from some other (known) memory location (address).

The header data blocks could include separate pointer data to each of their respective sub-blocks, but in an embodiment, the header data block includes pointer data to a base, e.g., start, location (a base, e.g. start, address) in memory where the set of sub-blocks that the header relates to are stored, with the locations of the individual sub-blocks then being derived from that base, e.g., start, memory location. This can help to reduce the amount of pointer data that needs to be stored in each header data block.

In such an arrangement, particularly where the sub-blocks for a given data block are stored contiguously in memory (as discussed above), then the memory location of an individual sub-block is in an embodiment derived from the base "set of sub-blocks" location by using the size of the sub-blocks in memory (i.e. the memory space occupied by the data that has been stored for the sub-blocks) to step from the base memory location to the (data for the) sub-block of interest. Thus, for example, if the second sub-block is required, its location (the location of its data) will be derived, for example, by adding the size of the first sub-block in memory to the base memory location for the set of sub-blocks.

In these arrangements, the header data blocks in an embodiment include data indicating the sizes in memory of the stored sub-blocks (of the stored data for the sub-blocks) that the header data block relates to, e.g. in bytes. This then means that the decoder (for example) wishing to retrieve the stored sub-block data can determine the location of the sub-block data from reading the header data block alone (and so, e.g., avoids the need for reads from plural different places to determine the memory location of the sub-block data of interest). Thus, in an embodiment, the header data blocks include pointer data indicating a base (e.g. start) memory location for the data for the set of sub-blocks that the header corresponds to, together with data indicating the size (in memory) of the data for some or all, and in an embodiment for each, of the sub-blocks in the set of sub-blocks.

In these arrangements, there will, accordingly, be a field or fields within the header data block for indicating the sizes of the sub-blocks. Where these fields may be able to indicate sub-block size values that may in fact never be used (e.g. because they will be impossible to achieve with the compression scheme being used), then in an embodiment, such unused size indication values (i.e. size indication values that will not (that will never) be needed to indicate the size of a sub-block) are used to indicate (predetermined) "special" cases, such as an uncompressed block, or a one colour block. It would also be possible to deliberately set a size value (or values) aside for this purpose, if desired, e.g., by encoding encoded blocks that would normally have that size value such that they instead have a different size value. For example, if a block size of, e.g., 63 is used to indicate an uncompressed block, a block which compressed to 63 bytes could instead be sent as an uncompressed block.

Thus, in an embodiment, one or more sub-block size values that may be included in a header data block are predefined as (and set aside for) indicating a particular, special case, such as a particular kind of data block, rather than a sub-block size. This can allow the scheme of the technology described herein to indicate such special cases in a more efficient manner.

Where, as discussed above, the data for a set of sub-blocks may extend across two sub-block storage blocks in the memory, then the header data block in an embodiment indicates this. In an embodiment this is done by including pointer data both to the location of the data for the set of sub-blocks in the first sub-block storage block and pointer data to the location of the data for the set of sub-blocks in the second sub-block storage block in the header data block.

The header data blocks may be configured and arranged as desired. In an embodiment, each header data block is of a size that is suitable for (and in an embodiment optimised for) fetching and caching in the data processing system in question. Thus, the header data blocks in an embodiment correspond to the amount of data that the data processing system can and will (typically) fetch in a single burst (i.e. to a burst size that the data processing system commonly uses). This then makes the process of fetching the header data blocks "burst friendly". The header data blocks are all in an embodiment the same, fixed, size. A suitable header data block size to achieve this is 64 bytes.

Each header data block could contain only the pointer data (and any desired sub-block size data). However, particularly where the header data blocks are configured to match a desired burst size, it may be that each header data block will have the capacity to include more data than just the pointer data (and any desired sub-block size data). In an embodiment, any such extra header data block data capacity is filled, at least in part, with other useful data. Such other useful data could, for example, and in an embodiment does, include data that is to be used in common for the sub-blocks that the header data block relates to when decoding the sub-blocks. It could also or instead, include data relating to a specific sub-block, although in an embodiment such data is only included in a header data block if there is still space after any "common" (shared) data has been included in the header data block). This helps to further enhance the efficiency of the data storage arrangement of the technology described herein.

Thus, in an embodiment, the header data blocks are of a predefined, fixed size, in an embodiment corresponding to a burst size of the data processing system in question, and any unused space in a header data block after the pointer data (and any other sub-block location data) has been included in the header data block is filled with other useful data. The other useful data is in an embodiment data that is to be used in common for (e.g. when decoding) the sub-blocks that the header data block relates to, followed by data for specific sub-blocks (if any space remains in the header data block). For certain forms of block, such as single colour blocks, it may in fact be possible to include all the encoded data for the block in the header data block (such that there will then be no need for any separate sub-block data for the block).

Although the technology described herein has been described above with particular reference to the storing of the data for the data array, as will be appreciated by those skilled in the art, the technology described herein also extends to the corresponding process of reading (and decoding) data that has been stored in the manner of the technology described herein.

Thus, another embodiment of the technology described herein comprises a method of determining the value of a data element of a stored data array in a data processing system, the method comprising:

determining the memory location of a stored header data block for a block of the data array that the data element falls within;

reading the header data block and determining therefrom pointer data indicating the memory location of data representing a sub-block of the block of the data array that the data element falls within; and reading the sub-block data from the determined memory location and using the read sub-block data to determine the value of the data element.

Another embodiment of the technology described herein comprises an apparatus for determining the value of a data element of a stored data array in a data processing system, the apparatus comprising:

processing circuitry configured to:

determine the memory location of a header data block for a block of the data array that the data element falls within;

read the header data block and determine therefrom pointer data indicating the memory location of data representing a sub-block of the block of the data array that the data element falls within; and read the sub-block data from the determined memory location and use the read sub-block data to determine the value of the data element.

In some embodiments, the processing circuitry may be in communication with one or more memory devices that store the data described herein and/or store software for performing the processes described herein. The processing circuitry may also be in communication with a display for displaying images based on the data described above.

As will be appreciated by those skilled in the art, these embodiments of the technology described herein can, and in some embodiments do, include any one or more or all of the optional features of the technology described herein, as appropriate.

Thus, for example, the data processing system is in an embodiment a graphics processing system, and the data array is in an embodiment a graphics texture (in which case the data element is in an embodiment a texel), or a frame for display (in a frame buffer) (in which case the data element is in an embodiment a pixel or a sampling position), etc. Similarly, the apparatus for determining the value of a data element of a stored data array in a data processing system is in an embodiment incorporated in a graphics processor or a display controller.

Similarly, the position of the header data block in memory is in an embodiment determined, in an embodiment in a predetermined manner, from the relative position of the data element within the data array. In an embodiment a pointer to a base memory location and sub-block size data is read from the header data block and used to determine the location of the sub-block of interest in memory.

These embodiments of the technology described herein may accordingly further include reading further data from the header data block that is to be used together with the read sub-block data to determine the value of the data element (and using that further data together with the read sub-block data to determine the value of the data element). Such further data in the header data block could comprise, as discussed above, data that is to be used in common for plural sub-blocks (that the header block relates to), and/or data that is specific to a given sub-block (that the header block relates to).

The technology described herein also extends to a method and system that both stores and then reads the data for the data array in the manners discussed above.

The methods and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so-stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it will be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semi-conductor platform.

The technology described herein is particularly, but not exclusively, suitable for use in low power and portable devices. Thus, in an embodiment, the technology described herein is implemented in a portable device, such as a mobile telephone or PDA.

Similarly, the memory where the header data blocks and the sub-block data is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

In the case of a texture data array, the memory is in an embodiment a texture buffer of the graphics processing system (which buffer may, e.g., be on-chip, or in external memory, as desired). Similarly, in the case of a frame for the display, the memory is in an embodiment a frame buffer for the graphics processing system and/or for the display that the graphics processing system's output is to be provided to.

The header block data and the sub-blocks data is in an embodiment stored in the same physical memory, although this is not essential.

Other memory arrangements would, of course, be possible.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor.

The technology described herein is applicable to any suitable form or configuration of graphics processor and renderer, such as tile-based graphics processors, immediate mode renderers, processors having a "pipelined" rendering arrangement, etc.

It will also be appreciated by those skilled in the art that all of the described embodiments of the technology described herein can include, as appropriate, any one or more or all of the optional features of the technology described herein.

The methods in accordance with the technology described herein may be implemented at least partially using software e.g. computer programs. It will thus be seen that further embodiments of the technology described herein comprise computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

Figure 1:
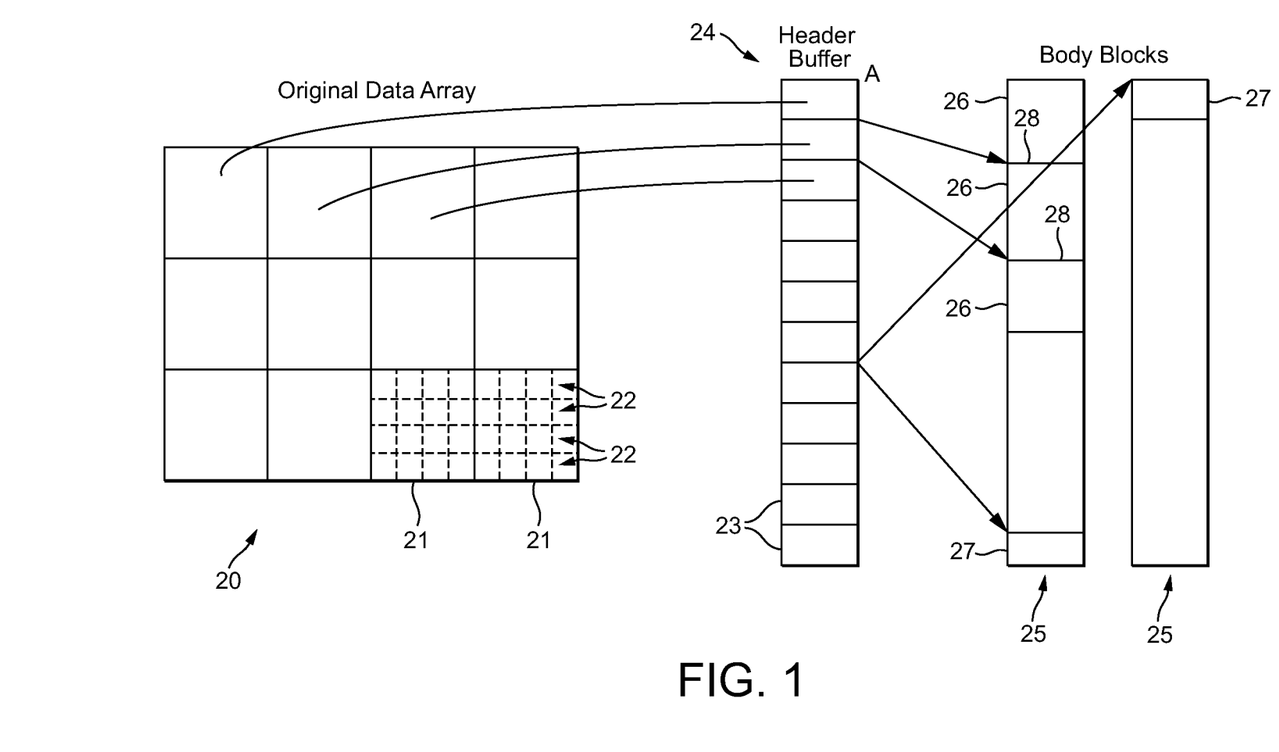
FIG. 1 shows schematically the storing of an array of data in accordance with an embodiment of the technology described herein.

FIG. 1 shows schematically the way that an array of original data 20 is stored in an embodiment of the technology described herein.

The array of original data 20 is a two-dimensional data array containing a plurality of data elements (containing data entries at a plurality of particular positions within the array). The data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBa, or luminance and chrominance, values for the texel). In the case of a frame for display, each data entry (position) in the array will indicate a set of colour values (e.g. RBG values) to be used for displaying the frame on a display.

As shown in FIG. 1, to store the data array 20 in memory, the data array 20 is first divided into a plurality of non-overlapping, equal-size and uniform blocks 21, each block corresponding to a particular region of the data array 20. In the present embodiment, each block 21 of the data array corresponds to a block of 16×16 elements (positions) within the data array 20 (i.e. a block of 16×16 texels in the case of a texture map). Other arrangements would, of course, be possible.

Each block 21 that the data array 20 is divided into is further sub-divided into a set of sixteen non-overlapping, uniform and equal-size sub-blocks 22. In the present case, as each block 21 corresponds to 16×16 elements (positions) within the data array, each sub-block 22 accordingly corresponds to a 4×4 data element region within the block 21 (e.g. 4×4 texels in the case of a texture map). (FIG. 1 only shows the division of a few of the blocks 21 of the data array 20 into sub-blocks for simplicity. However, each and every block 21 that the original data array 20 is divided into is correspondingly sub-divided into a set of plural sub-blocks 22.)

To store the data array 20 in memory, firstly a header data block 23 is stored for each block 21 that the data array 20 has been divided into. These header data blocks are stored in a header buffer 24 in memory. The header buffer 24 starts at a start address A in memory, and the header data blocks 23 are each stored at a predictable memory address within the header buffer 24.

FIG. 1 shows the positions of the header data blocks 23 in the header buffer 24 for some of the blocks 21 that the data array 20 is divided into. Each block 21 that the data array 20 is divided into has a corresponding header data block 23 in the header buffer 24.

The position that each header data block 23 is stored at within the header buffer 24 is determined from (predicted from) the position within the data array of the block 21 that the header data block 23 relates to. In particular, the address of the header data block 21 in the header buffer 24 for a data array element (e.g. texel or pixel) at a position x, y within the data array 20 is given by:

header data block address=$A+64*(x/16+(y*\text{xsize}/16)$ where A is the start address of the header buffer, xsize and ysize are the vertical and horizontal dimensions, respectively, of the data array 20, and it is assumed that the data array 20 is divided into 16×16 blocks and each header data block occupies 64 bytes.

In the present embodiment, each header data block 23 in the header buffer 24 has the same, fixed size, corresponding to the burst-size used by the data processing system in which the stored data array is to be used. This means that the header data blocks 23 are of a size that can be fetched using a system-friendly burst size.

As well as storing a respective header data block 23 in the header buffer 24 for each block 21 that the original data 20 is divided into, the data storage arrangement of the present embodiment also stores data for each sub-block 22 that a given data block is divided into. This sub-block data is stored in memory in sub-block storage or body blocks 25, which comprise in the present embodiment aligned blocks of 1024 bytes. (Having the body blocks storing the sub-block data in 1024 byte sub-block storage blocks provides the ability to encode the data array with several different encoders in parallel, by each encoder allocating a new block through a central repository every time it runs out of space.) In the present embodiment, the body blocks 25 are stored directly after the header buffer 24 (but may appear in random order there). This allows the pointer data in the header data blocks to be in the form of offsets from the end of the header buffer 24. (This is not essential, and the body blocks 25 may reside anywhere in memory, if desired.)

The sets of data 26 for each respective set of sub-blocks are stored in the body blocks one after another, as shown in FIG. 1. This has the effect then that the data for a set of sub-blocks 22 for a given 16×16 block 21 can span two different body blocks 25 (as shown in FIG. 1 for the set 27 of sub-block data).

Figure 2:
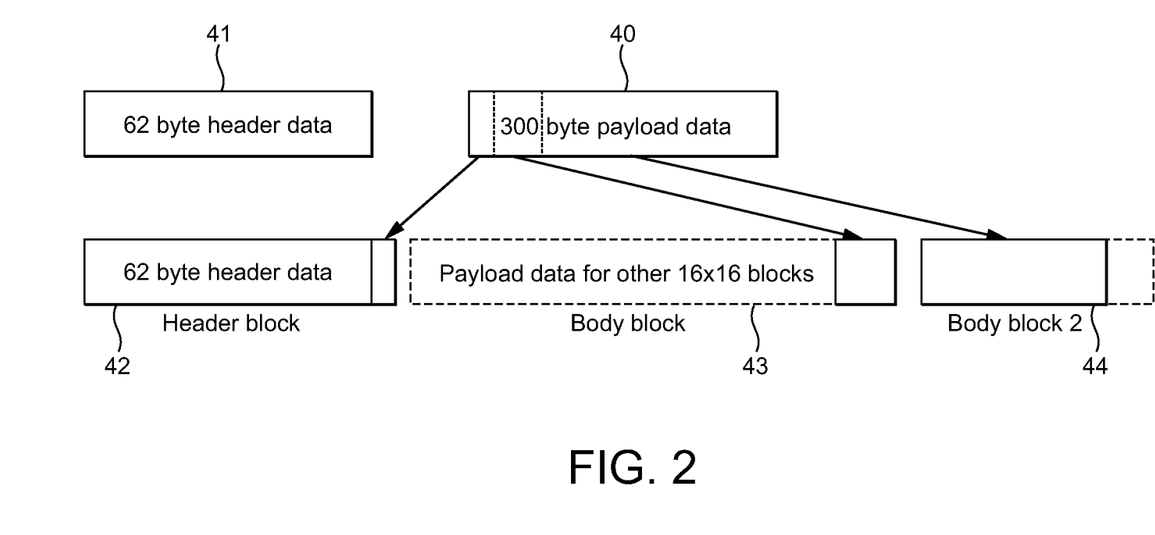
FIG. 2 shows schematically the distribution of data for a block of a data array between a header block and body blocks in memory in an embodiment of the technology described herein.

FIG. 2 shows this in more detail. If it is assumed that the "payload" data 40 to be stored for the set of 4×4 sub-blocks corresponding to a given 16×16 block of the data array comprises 300 bytes, and the header data 41 to be stored for the block comprises 62 bytes, as shown in FIG. 2, then if the header block 42 has a capacity of 64 bytes, the first two bytes of "payload" data will be stored in the header block, and then the remaining bytes of payload data distributed between one or two body blocks 43, 44 (depending upon the available space in the first body block). (Typically, the sub-block "payload" data will be stored in the header block and 0-2 body blocks, depending on the amount of that data and the available capacity in the respective header and body blocks.)

The header buffer 24 and body blocks 25 may be stored in any suitable memory of the data processing system in question. Thus, for example, they may be stored in an on-chip memory or in an external memory, such as a main memory of the data processing system. They are in an embodiment stored in the same physical memory, but that is not essential.

Some or all of the header buffer and body blocks could also be copied to a local memory (e.g. cached), in use, if desired.

The data that is stored for each sub-block in the body blocks 25 could simply comprise the data in the data array 20 for the corresponding data elements (entries) that the sub-block corresponds to. However, in the present embodiment, rather than storing the data array 20 in its full, original form, each data array sub-block 22 is encoded to give an encoded representation of the original data that has a reduced size as compared to the data in its original, unencoded form. This compresses the original data, thereby making its storage and processing more efficient. Any suitable and desired encoding (compression) process can be used for this encoding.

Thus, in the present embodiment, the original data array 20 is encoded and compressed, before it is stored, so the data that is stored in respect of each sub-block 22 will be data that can be appropriately decoded to derive the data entries for the original data array. In other words, the data that is stored in respect of each sub-block 22 will be data from which the original data elements (or at least a desired approximation to the value of those data elements (e.g. where a lossy encoding (compression) scheme is being used)) can be derived. It will be data that can be used to determine the values of the data elements in the original data array (or at least desired approximations to those original data values) for the data elements in the sub-block in question.

Each header data block contains pointer data indicating the position within a body block 25 where the data for the sub-blocks for the block 21 that that header data block 23 relates to is stored. In the case where the sub-block data for a given data block spans two different body blocks (as illustrated in FIG. 1), the header data block 23 will contain a second pointer to indicate the position of the second body block in which the data for the set of sub-blocks is stored. In the present embodiment, this pointer comprises the upper 22 bits of a 1024 byte aligned address. (In the present embodiment, each header data block contains pointers to both a first and a second body block, irrespective of whether a given block's sub-block data will extend into a second body block. This is to allow for the fact that when the encoding process is started, it may not be known before the data is written to memory whether a second body block will be used or not.)

In the present embodiment, the pointer data in the header data blocks 23 indicates the start position 28 in the body block 25 in memory of the stored data 26 for the respective sub-blocks that the header data block relates to. In order to locate the data for the individual 4×4 sub-blocks, it is accordingly necessary for the decoder to be able to determine the location of the data for the individual 4×4 sub-blocks within the overall set of data 26 for the sub-blocks in question. This is achieved in the present embodiment by including in the header data block 23 the sizes of the stored data for each respective 4×4 sub-block (in bytes).

To locate the data for an individual 4×4 sub-block in a body block 25, the decoder then accordingly uses the pointer in the header data block 23 to determine the start position 28 of the data 26 for the set of sixteen 4×4 sub-blocks that the header data block 23 relates to in the body block 25, and then uses the size information in the header data block 23 to sum the sizes of the stored data for the 4×4 sub-blocks that are stored prior to the 4×4 sub-block of interest, to determine the start position for the data in the body block 25 for the sub-block of interest. The end position of the data for the sub-block of interest is correspondingly determined using the indicated stored data size for the sub-block in question.

Including the sub-block size information in the header data blocks avoids the need to have to read multiple different places in memory in order to identify the memory location of the desired sub-block data.

In the present embodiment, if there are some sizes of stored sub-block data that can be indicated by the size fields in the header data blocks, but which sizes will not in fact occur in use (e.g. because they are impossible to achieve with the compression or encoding scheme that is being used), then those size values are predefined as indicating special cases, such as an uncompressed data block or a one colour block. This facilitates signalling such special cases to the decoder in an efficient manner.

If, after the pointer and sub-block size data has been included in a header data block 23, there is any remaining space in the header data block, then rather than leaving that space unused, it is filled with further useful information, such as, and in particular, data that will be needed to, or that can be used to, determine the values of data elements for the sub-blocks to which the header data block relates (i.e. data to be used to decode the sub-blocks data).

For example, part of the encoded (e.g. compressed) data representing the original data array that is to be used for all of the sub-blocks that the header data block relates to for the decoding process could be included in the "spare" space in the header data block. It would also be possible to include in the header data block data that is specific to a given sub-block if there is any remaining space in the header data block after the data to be used in common by (shared by) all the sub-blocks that the header data block relates to has been included in the header data block. Filling the header data blocks with other useful data such as this means that the header data blocks can be of a size that can be fetched using a system-friendly burst size, without wasting memory space.

In the present embodiment, 64-byte header data blocks are used, and the layout of the header data block is typically a 1 byte exact pointer to a body block (sub-block storage block), occupying e.g. 32 bits, one body block size-aligned pointer to a second body block (which can be 22 bits, as discussed above), 16 sets of sub-block size data (each typically occupying 6-bits), with the rest of the header data block filled with encoded sub-block data.

In operation to encode a data array 20 in the manner of the present embodiment, suitably configured and/or programmed processing circuitry will receive and/or fetch from memory a stream of data representing the original data array 20, and operate to divide the data array 20 into blocks and sub-blocks as discussed above, generate appropriate header data blocks and store those blocks in a header buffer 24, and generate encoded versions of the sub-blocks of the data array and store data for those encoded versions of the sub-blocks of the data array in the body blocks 25 in memory.

The above primarily describes the way in the present embodiment that the data array is processed and stored in memory for use. When the so-stored data array comes to be used, for example to apply to fragments to be rendered (where the stored data array is a texture map for use in graphics processing), then the reading and decoding process for the stored data array will essentially comprise the reverse of the above storing and encoding process.

Thus, the decoding device, such as a graphics processor (e.g. where the stored data array is texture map) or a display controller (e.g., where the stored data array is a frame to be displayed), will first identify the position(s) of the particular element or elements in the data array that are of interest (i.e., whose values are to be determined). It will then determine the start address A of the header buffer for the data array (if necessary, this can be communicated to the decoder by the, e.g., software that controls the encoder and decoder setting a control register with a pointer to the header buffer), and then use that start address together with the position of the data array element or elements that are of interest to determine the location of the header data block for the block of the data array that the data element(s) falls within in the manner discussed above.

The decoder will then read the header data block from the identified memory location and determine therefrom the pointer data and sub-block size data indicating the memory location in the body blocks 25 of the relevant data representing the sub-block of the block of the data array that the data element or elements falls within. The decoder will then read the relevant sub-block data from the determined location in the body blocks 25, and decode that data, using if necessary any other encoded data that is stored in the header data block (as discussed above), to determine the value of the data element or elements of interest.

This process can then be repeated for each data element of interest (whose value is required).

Figure 3:
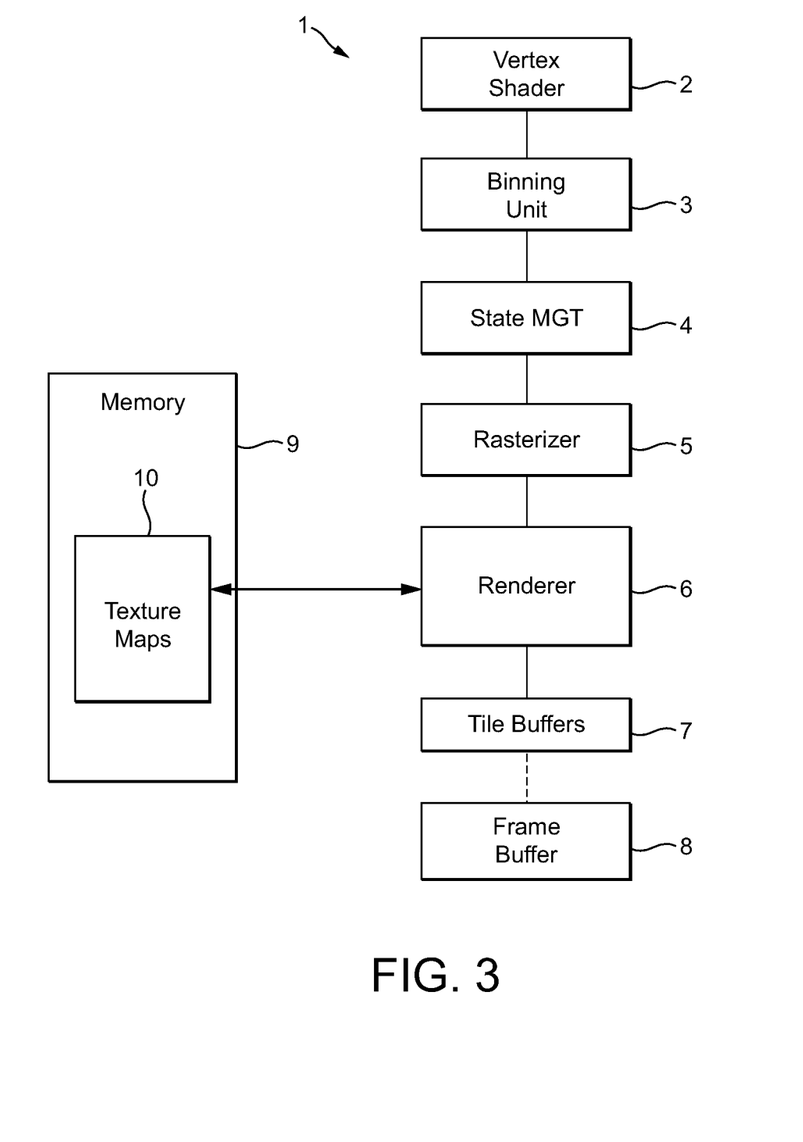
FIG. 3 shows schematically a graphics processing system that may use data arrays stored in accordance with the technology described herein.

FIG. 3 shows schematically an arrangement of a graphics processing system 1 that can store and use data arrays that have been stored in the manner of the present embodiment.

FIG. 3 shows a tile-based graphics processing system. However, as will be appreciated, and as discussed above, the technology described herein can be implemented in other arrangements of graphics processing system as well (and, indeed, in other data processing systems).

The system includes, as shown in FIG. 3, a tile-based graphics processor (GPU) 1. This graphics processor 1 generates output data arrays, such as output frames intended for display on a display device, such as a screen or printer, in response to instructions to render graphics objects, etc. that it receives.

As shown in FIG. 3, the graphics processor 1 includes a vertex shader 2, a binning unit 3, a state management unit 4, a rasterising stage 5, and a rendering stage 6 in the form of a rendering pipeline.

The vertex shader 2 receives descriptions of graphics objects to be drawn, vertices, etc., e.g. from a driver (not shown) for the graphics processor 1, and performs appropriate vertex shading operations on those objects and vertices, etc., so as to, for example, perform appropriate transform and lighting operations on the objects and vertices.

The binning unit 3 sorts (bins) the various primitives, objects, etc., required for an output to be generated by the graphics processor 1 (such as a frame to be displayed) into the appropriate bins (tile lists) for the tiles that the output to be generated is divided into (since, as discussed above, this exemplary graphics processing system is a tile-based graphics processing system).

The state management unit 4 stores and controls state data and the state of the graphics processing units to control the graphics processing operation.

The rasteriser 5 takes as its input primitives to be displayed, and rasterises those primitives to sampling positions and fragments to be rendered.

The rendering pipeline 6 takes fragments from the rasteriser 5 and renders those fragments to generate the output data (the data for the output (e.g. frame to be displayed) of the graphics processor 1).

As is known in the art, the rendering pipeline will include a number of different processing units, such as fragment shaders, blenders, texture mappers, etc.

In particular, as shown in FIG. 3, the rendering unit 6 will, inter alia, access texture maps 10 stored in a memory 9 that is accessible to the graphics processor 1, so as to be able to apply the relevant textures to fragments that it is rendering (as is known in the art). The memory 9 where the texture maps 10 are stored may be an on-chip buffer or external memory (e.g. main system memory) that is accessible to the graphics processor 1.

The graphics processor 1 generates its output data arrays, such as output frames, by generating tiles representing different regions of a respective output data array (as it is a tile-based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR-SDRAM) of the system (not shown). The data from the tile buffers may be downsampled before it is written to the frame buffer, if desired.

The texture maps 10 and the frame buffer 8 may be stored in the same physical memory, or they may be stored in different memories, as desired.

Sometime later, the data array in the frame buffer 3 will be read by a display controller and output to a display device for display (not shown).

The graphics processing system shown in FIG. 3 uses the data array storing and decoding arrangement of the embodiment described above with reference to FIG. 1 in respect of both the stored texture maps 10 in the memory 9, and when storing its output data in the frame buffer 8.

Thus, each texture map 10 that is stored in the memory 9 for use by the rendering unit 6 is stored in the form described above and shown in FIG. 1. Accordingly, when the rendering unit 6 needs to access a texture map, it will read and decode the texture map data in the manner described above with reference to FIG. 1.

Similarly, when the generated output data from the graphics processor 1 is written to the frame buffer 8 from the tile buffer 7, that data is processed in the manner described above with reference to FIG. 1, to take the data from the tile buffers 7 and store it in the format shown in FIG. 1 in the frame buffer 8. This data can then be read and decoded from the frame buffer 8 in the manner described above with reference to FIG. 1 by, e.g., the display controller of the display on which the frame is to be displayed.

It will be appreciated that each of the stages, elements, and units, etc., of the graphics processor as shown in FIG. 3 may be implemented as desired and will accordingly comprise, e.g., appropriate circuitry, and/or processing logic, programmable logic, etc., for performing the necessary operations and functions, and will provide the appropriate control and processing circuitry, etc., for performing the technology described herein.

It will also be appreciated here that FIG. 3 simply shows the arrangements schematically, and thus, for example, the data flow in operation of the technology described herein need not and may not be as shown in FIG. 3, but may, for example, involve the looping back of data as between the various units and stages shown in FIG. 3 as appropriate.

Although, the present embodiment has been described above as dividing the data array into 16×16 blocks of data elements, other arrangements could be used. For example, the data array could be divided into 8×8 or 16×4 blocks, if desired.

Also, although the present embodiments have been described above with particular reference to the use of the techniques of the present embodiment with graphics processors and display controllers, the techniques of the technology described herein can be used for other data array and in particular image processing arrangements. For example, they may be used in image signal processors and video decoders and encoders (MPEG/h.264, etc.). In these cases, for example, the techniques of the technology described herein could be used to store an image generated by an image signal processor which is processing data received from an image sensor to make a watchable image out of it. A video encoder/decoder, for example, could load an image (e.g. video frame) stored in the form of the technology described herein to then compress the image using some other standard like h.264, and correspondingly store frames of video data using the techniques of the technology described herein, for example for provision to a graphics processor or a display controller.

As can be seen from the above, the technology described herein, in some embodiments at least, provides a method and apparatus for storing data arrays that can allow the stored data to take less memory space (to be stored more efficiently), reduce the amount of memory traffic for reading the stored data, and/or make more efficient the memory traffic for reading the stored data. It can accordingly, thereby reduce power consumption.

The technology described herein in some embodiments at least can also provide a way to link variable-sized compressed data in memory to allow random access while at the same time granting energy-efficient access patterns and allowing for multiple encoders to encode the data stream in parallel. When used for compressed texture data it allows variable-size compressed data to be fetched without decompressing the whole stream. When used as a frame buffer format it allows simple rotation and cropping. This all reduces bandwidth and power on a system level.

This is achieved, in some embodiments at least, by dividing a data array to be stored into plural blocks, further dividing each respective block of the data array into a set of sub-blocks, and storing data representing the sub-blocks together with a header data block for each set of sub-blocks (i.e. for each block that the data array is divided into), which header includes pointer data indicating where the respective sub-block data can be found. In some embodiments, the header data blocks also contain further data to be used when determining the data values for data elements of the stored data array, and are in an embodiment configured to be of a burst-friendly size for the data processing system in question.

The data storage arrangement of the technology described herein is particularly suited to use for textures and frame buffers, and can decrease external bandwidth as well as facilitating random access to the stored data and being decodable at line speed for the texture cache. The arrangement of the technology described herein, in some embodiments at least, allows the efficient fetching of the data for a given sub-block within the overall data array, and with little overhead.

The technology described herein can also provide predictable memory read patterns for a display controller (when used as a frame buffer format) whilst still retaining random access possibilities for use for textures (for a texture mapper) for example. Using the same data storage format structure both for the frame buffer and for textures provides a more simplified system.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of storing an array of data comprising a plurality of data elements in memory, the method comprising:

dividing the array of data to be stored into a plurality of blocks, wherein each block comprises a sub-set of the data elements in the data array;

dividing each respective block of the data array into a plurality of sub-blocks, wherein each sub-block comprises a sub-set of the data elements of the block that the sub-block relates to;

storing for each respective sub-block of the data array, data representing the data elements of the sub-block in memory; and storing, for each respective block that the data array has been divided into, a header data block at a predictable memory address, the header data block containing pointer data indicating the location in memory where the data for the data elements for the sub-blocks for the block of the data array that the header data block relates to is stored.

2. The method of claim 1, further comprising:
storing the data representing the data elements of respective sub-blocks of the data array in memory in fixed size, and aligned, blocks in memory.

3. The method of claim 1, further comprising:
storing all the header data blocks for a data array together in a header buffer for the data array.

4. The method of claim 1, further comprising:
storing each header data block at a memory address that can be predicted from the position within the data array of the block of the data array that the header data block relates to.

5. The method of claim 1, wherein:
each header data block includes pointer data indicating a base memory location for the data for the set of sub-blocks that the header corresponds to, together with data indicating the size in memory of the data for at least some of the sub-blocks in that set of sub-blocks.

6. The method of claim 1, wherein:
the header data blocks are of a predefined, fixed size, and any unused space in a header data block after the pointer data and any other sub-block location data has been included in the header data block is filled with other useful data.

7. A method of determining the value of a data element of a stored data array in a data processing system, wherein the data array comprises a plurality of data elements, the method comprising:
determining the memory location of a stored header data block for a block of the data array that the data element falls within, wherein the block comprises a sub-set of the data elements in the data array;
reading the header data block and determining therefrom pointer data indicating the memory location of data representing a sub-block of the block of the data array that the data element falls within, wherein the sub-block comprises a sub-set of the data elements of the block; and
reading the sub-block data from the determined memory location and using the read sub-block data to determine the value of the data element.

8. The method of claim 7, wherein:
the memory location of the header data block is determined from the position of the data element within the data array.

9. The method of claim 7, further comprising:
reading further data from the header data block and using that further data together with the read sub-block data to determine the value of the data element.

10. An apparatus for storing an array of data comprising a plurality of data elements in memory, comprising:
processing circuitry that divides the array of data to be stored into a plurality of blocks, wherein each block comprises a sub-set of the data elements in the data array,
divides each respective block of the data array into a plurality of sub-blocks, wherein each sub-block comprises a sub-set of the data elements of the block that the sub-block relates to;
stores for each respective sub-block of the data array, data representing the data elements of the sub-block in memory; and
stores, for each respective block that the data array has been divided into, a header data block at a predictable memory address, the header data block containing pointer data indicating the location in memory where the data for the data elements for the sub-blocks for the block of the data array that the header data block relates to is stored.

11. The apparatus of claim 10, wherein:
the processing circuitry stores data representing the data elements of respective sub-blocks of the data array in memory in fixed size, and aligned, blocks in memory.

12. The apparatus of claim 10, wherein:
the processing circuitry stores all the header data blocks for a data array together in a header buffer for the data array.

13. The apparatus of claim 10, wherein:
the processing circuitry stores each header data block at a memory address that can be predicted from the position within the data array of the block of the data array that the header data block relates to.

14. The apparatus of claim 10, wherein:
each header data block includes pointer data indicating a base memory location for the data for the set of sub-blocks that the header corresponds to, together with data indicating the size in memory of the data for at least some of the sub-blocks in that set of sub-blocks.

15. The apparatus of claim 10, wherein:
the header data blocks are of a predefined, fixed size, and any unused space in a header data block after the pointer data and any other sub-block location data has been included in the header data block is filled with other useful data.

16. An apparatus for determining the value of a data element of a stored data array in a data processing system, wherein the data array comprises a plurality of data elements, comprising:
processing circuitry that determines the memory location of a header data block for a block of the data array that the data element falls within, wherein the block comprises a sub-set of the data elements, reads the header data block and determines therefrom pointer data indicating the memory location of data representing a sub-block of the block of the data array that the data element falls within, wherein the sub-block comprises a sub-set of the data elements of the block, and reads the sub-block data from the determined memory location and uses the read sub-block data to determine the value of the data element.

17. The apparatus of claim 16, wherein:
the memory location of the header data block is determined from the position of the data element within the data array.

18. The apparatus of claim 16, wherein:
the processing circuitry reads further data from the header data block and uses that further data together with the read sub-block data to determine the value of the data element.

19. A non-transitory computer readable storage medium storing computer software code which when executing on a processor performs a method of storing an array of data comprising a plurality of data elements in memory, the method comprising:
dividing the array of data to be stored into a plurality of blocks, wherein each block comprises a sub-set of the data elements in the data array;
dividing each respective block of the data array into a plurality of sub-blocks, wherein each sub-block comprises a sub-set of the data elements of the block that the sub-block relates to;
storing for each respective sub-block of the data array, data representing the data elements of the sub-block in memory; and storing, for each respective block that the data array has been divided into, a header data block at a predictable memory address, the header data block containing pointer data indicating the location in memory where the data for the data elements for the sub-blocks for the block of the data array that the header data block relates to is stored.

20. A non-transitory computer readable storage medium storing computer software code which when executing on a processor performs a method of determining the value of a data element of a stored data array in a data processing system, wherein the data array comprises a plurality of data elements, the method comprising:

determining the memory location of a stored header data block for a block of the data array that the data element falls within, wherein the block comprises a sub-set of the data elements in the data array;

reading the header data block and determining therefrom pointer data indicating the memory location of data representing a sub-block of the block of the data array that the data element falls within, wherein the sub-block comprises a sub-set of the data elements of the block; and reading the sub-block data from the determined memory location and using the read sub-block data to determine the value of the data element.

* * * * *